United States Patent
Burdy et al.

(10) Patent No.: US 10,249,855 B2
(45) Date of Patent: Apr. 2, 2019

(54) FLEXIBLE BATTERY COVER WITH INTEGRAL LID, METHOD OF CONSTRUCTION THEREOF, AND METHOD OF ENCLOSING A BATTERY THEREWITH

(71) Applicant: Federal-Mogul Powertrain, Inc., Southfield, MI (US)

(72) Inventors: John E. Burdy, Elverson, PA (US); Daniel A. Rowcotsky, Dresher, PA (US); Christopher J. Pinkow, Garnet Valley, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 477 days.

(21) Appl. No.: 14/833,461

(22) Filed: Aug. 24, 2015

(65) Prior Publication Data
US 2016/0064706 A1 Mar. 3, 2016

Related U.S. Application Data

(60) Provisional application No. 62/043,969, filed on Aug. 29, 2014.

(51) Int. Cl.
*H01M 2/10* (2006.01)
*H01M 10/625* (2014.01)
(Continued)

(52) U.S. Cl.
CPC ....... *H01M 2/1072* (2013.01); *H01M 2/1094* (2013.01); *H01M 10/613* (2015.04);
(Continued)

(58) Field of Classification Search
CPC ... B60R 16/04; H01M 10/613; H01M 10/625; H01M 10/647; H01M 10/658;
(Continued)

(56) References Cited

U.S. PATENT DOCUMENTS 2,707,721 A  5/1955  Anderson et al.
3,146,132 A  8/1964  Nathan
(Continued)

FOREIGN PATENT DOCUMENTS

CN  1842929 A  10/2006
CN  202399877 U  8/2012
(Continued)

OTHER PUBLICATIONS

International Search Report, dated Dec. 2, 2015 (PCT/US2015/046511).

*Primary Examiner* — Alix E Eggerding
(74) *Attorney, Agent, or Firm* — Robert L. Stearns; Dickinson Wright, PLLC

(57) ABSTRACT

A flexible one piece, insulative battery cover; battery cover assembly therewith; method of construction thereof, and method of enclosing a battery therewith are provided. The battery cover includes a flexible, tubular textile wall having a cavity extending between a bottom end and an open top end of the wall. The cover further includes a flexible textile lid having a free end and an opposite end attached to the wall via a hinge, with the lid being pivotal via the hinge between an open position, exposing the open top end of the wall, and a closed position, substantially closing off the top end. Further yet, the cover includes a fastener fixed to the lid adjacent the free end, with the fastener being configured to for releasable attachment to an elongate fastener member of the vehicle battery assembly.

16 Claims, 5 Drawing Sheets

(51) Int. Cl.
*H01M 10/647* (2014.01)
*H01M 10/613* (2014.01)
*H01M 10/658* (2014.01)
*B60R 16/04* (2006.01)

(52) U.S. Cl.
CPC ....... *H01M 10/625* (2015.04); *H01M 10/647* (2015.04); *H01M 10/658* (2015.04); *B60R 16/04* (2013.01); *H01M 2/1083* (2013.01); *H01M 2220/20* (2013.01)

(58) Field of Classification Search
CPC ........... H01M 2220/20; H01M 2/1072; H01M 2/1083; H01M 2/1094
See application file for complete search history.

(56) References Cited

U.S. PATENT DOCUMENTS

| | | | |
|---|---|---|---|
| 4,255,502 A * | 3/1981 | Taylor, III | H01M 2/10 429/120 |
| 4,535,863 A * | 8/1985 | Becker | H01M 2/1083 180/68.5 |
| 5,202,200 A | 4/1993 | McMillan, Jr. et al. | |
| 5,764,025 A * | 6/1998 | Lehmann | B60R 16/04 320/105 |
| 2005/0014061 A1 | 1/2005 | Ahn | |
| 2006/0068278 A1 | 3/2006 | Bloom et al. | |
| 2007/0166606 A1* | 7/2007 | Brecht | H01M 2/043 429/72 |
| 2008/0248377 A1 | 10/2008 | Hashida | |
| 2010/0147918 A1* | 6/2010 | Hensley | B62J 9/001 224/600 |
| 2011/0169238 A1* | 7/2011 | Schlegel | B62B 3/106 280/47.34 |
| 2013/0052518 A1 | 2/2013 | Harris et al. | |
| 2014/0287289 A1* | 9/2014 | Lee | H01M 2/1072 429/100 |
| 2014/0342207 A1 | 11/2014 | Tople et al. | |
| 2016/0064706 A1* | 3/2016 | Burdy | H01M 2/1072 429/179 |

FOREIGN PATENT DOCUMENTS

| | | |
|---|---|---|
| CN | 103038915 A | 4/2013 |
| CN | 203225283 U | 10/2013 |
| CN | 103633490 A | 3/2014 |
| DE | 10061643 A1 | 6/2002 |
| EP | 1164646 | 12/2001 |
| JP | 2005035514 | 2/2005 |

* cited by examiner

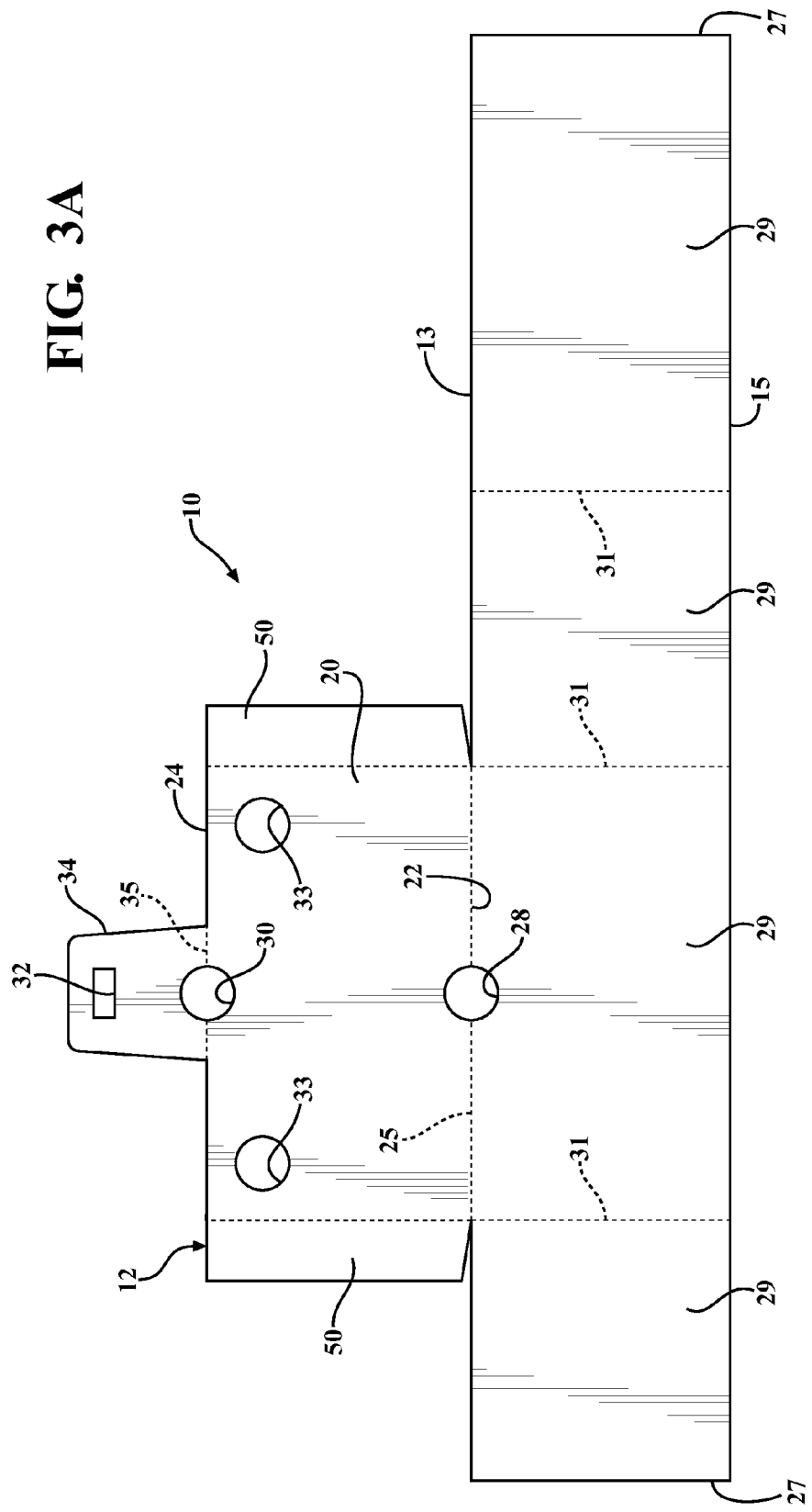

FLEXIBLE BATTERY COVER WITH INTEGRAL LID, METHOD OF CONSTRUCTION THEREOF, AND METHOD OF ENCLOSING A BATTERY THEREWITH

CROSS-REFERENCE TO RELATED APPLICATION

This application claims the benefit of U.S. Provisional Application Ser. No. 62/043,969, filed Aug. 29, 2014, which is incorporated herein by reference in its entirety.

BACKGROUND OF THE INVENTION

1. Technical Field

This invention relates generally to battery covers, and more particularly to flexible, insulative battery covers.

2. Related Art

A thermal insulator is generally needed to insulate a battery, such as a vehicle battery, from thermal degradation. Rigid plastic covers are commonly used to protect batteries; however, they are relatively heavy, and in addition, typically do not protect a battery against thermal conditions. Accordingly, rigid plastic covers generally do not provide the degree of insulation required to protect the battery against thermal degradation, thereby allowing the useful life of the battery to be reduced. In addition, rigid plastic battery covers are inflexible, generally bulky and cumbersome to ship, and in addition, occupy valuable storage space, thereby increasing shipping and inventory cost.

In addition to rigid plastic covers, generally tubular, nonwoven mats are also used to cover the sides of batteries, wherein the nonwoven mats having open ends, thereby leaving the bottom and top of the battery exposed to environmental conditions. In addition, it is known to cover a top of the battery with a separate piece of material, however, this introduces significant added cost, as a plurality of fasteners are needed to secure the separate piece of material to the nonwoven mat surrounding the sides of the battery. In addition, further cost is added due to the need to inventory separate battery cover components, including the separate pieces of batter cover materials, as well as the fasteners.

SUMMARY OF THE INVENTION

According to one aspect of the invention, a flexible one piece, insulative battery cover is provided. The cover includes a flexible, tubular textile wall having a cavity extending between a bottom end and an open top end of the wall. The cover further includes a flexible textile lid having a free end and an opposite end attached to the wall via a hinge, with the lid being pivotal via the hinge between an open position, exposing the open top end of the wall, and a closed position, substantially closing off the top end. Further yet, the cover includes a fastener fixed to the lid adjacent the free end, with the fastener being configured for releasable attachment to an elongate fastener member of the vehicle battery assembly.

In accordance with another aspect of the invention, the textile wall and lid include an intermediate nonwoven layer sandwiched between opposite nonwoven scrim layers.

In accordance with another aspect of the invention, the nonwoven scrim layers are spun bond layers.

In accordance with another aspect of the invention, the spun bond layers are constructed at least in part from heat-meltable fibers.

In accordance with another aspect of the invention, the lid has a pair of openings, with one of the openings being adjacent the fixed end of the lid and the other of the openings being adjacent the free end of the lid.

In accordance with another aspect of the invention, the cover has a fastener fixed to the lid adjacent the free end.

In accordance with another aspect of the invention, the fastener fixed adjacent the free end of the lid is operable for attachment to a J-hook.

In accordance with another aspect of the invention, a vehicle battery and insulative cover assembly is provided. The assembly includes a pair of elongate fastener members and an elongate clamp bracket having openings configured for receipt of the fastener members therethrough. The assembly further includes a flexible, tubular textile wall having a cavity extending between a bottom end and an open top end of the wall. A flexible textile lid having a free end and an opposite end is attached to the wall via a hinge. The lid is pivotal via the hinge between an open position, exposing the open top end of the wall, and a closed position, substantially closing off the. Further, a fastener is fixed to the lid adjacent the free end. The fastener is configured for releasable attachment to one of the elongate fastener members, thereby releasably maintaining the lid in the closed position to provide optimal protection to the enclosed battery.

In accordance with another aspect of the invention, a method of constructing a battery cover for a vehicle batter assembly is provided. The method includes forming a flexible, tubular textile wall to provide a cavity extending between a bottom end and an open top end of the wall. Further, providing a flexible textile lid having a free end and an opposite end attached to the wall via a hinge, with the lid being pivotal via the hinge between an open position, exposing the open top end of the wall, and a closed position, substantially closing off the top end. Further yet, fixing a fastener to the lid adjacent the free end of the lid, with the fastener being configured to for releasable attachment to an elongate fastener member of the vehicle battery assembly.

In accordance with another aspect of the invention, a method of enclosing a battery in a battery cover is provided. The method includes providing a flexible one piece, insulative battery cover. The cover is provided including a flexible, circumferentially continuous textile wall bounding a cavity that extends between a bottom end of the wall and an open top end of the wall. The cover further includes a flexible textile lid, wherein the lid is hingedly attached to the wall at a fixed end and extends to a free end opposite the fixed end. The cover is further provided with a fastener adjacent the free end. The method further includes disposing a battery in the cavity, and extending fastener members, such as J-hooks, along opposite outer sides of the wall. Then, the method further includes folding the lid from an open position to a closed position, whereupon the fastener members extend through corresponding openings in the lid of the cover. Then, the method includes operably fastening the fastener to one of the fastener members to substantially close the top end of the cover to fully conceal the battery within the cavity. Then, a bracket can be disposed on the fastener members and fastened thereto to fix the enclosed battery to the vehicle.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 3A is a plan view of a flat sheet of material formed into a predetermined configuration, in accordance with one aspect of the invention, with the material shown in an initial fabrication state prior to folding portions of the material into a batter cover;

DETAILED DESCRIPTION OF PRESENTLY PREFERRED EMBODIMENTS

Figure 1:
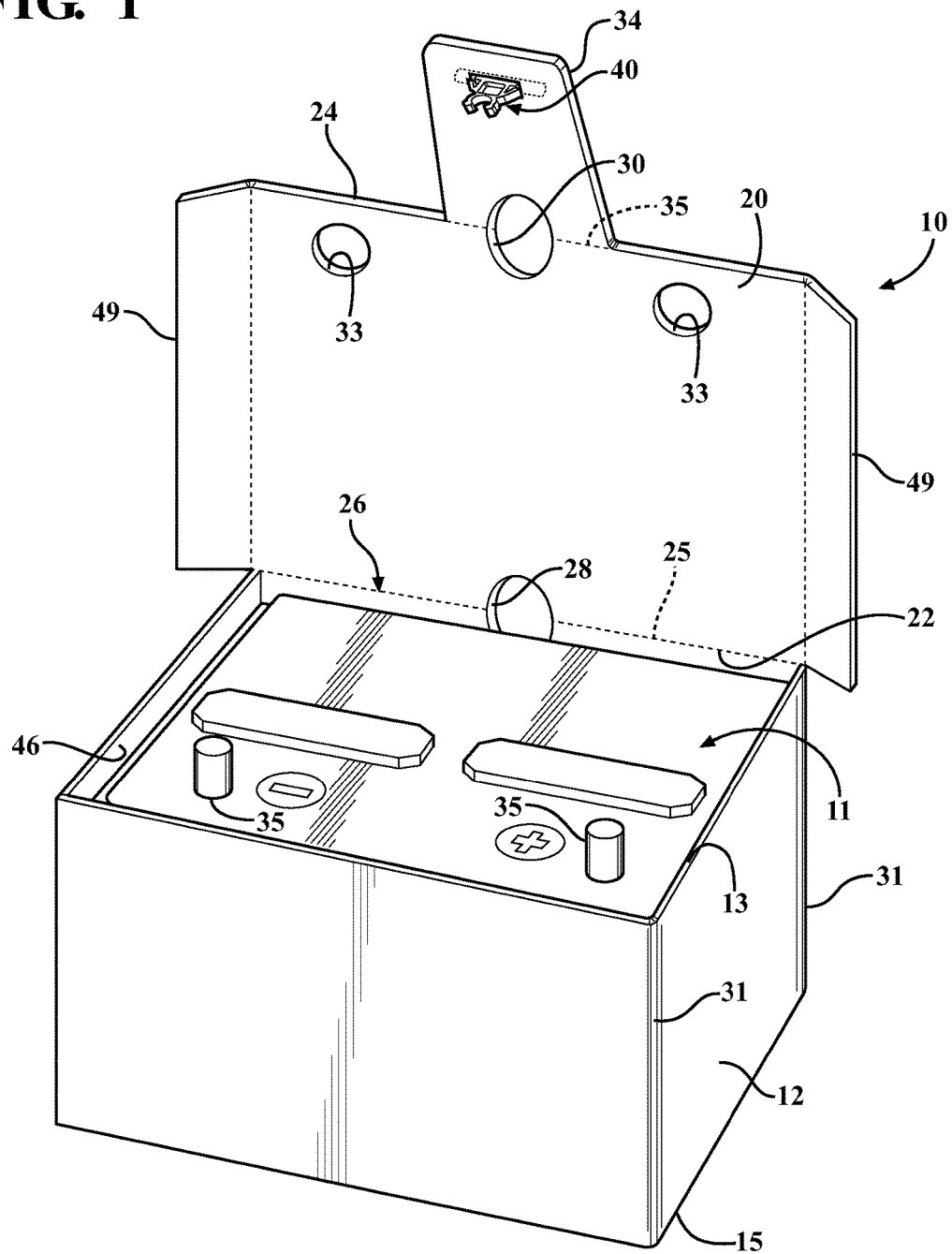
FIG. 1 is a perspective view of a one piece, insulative battery cover constructed in accordance with one aspect of the invention shown with a lid of the cover in an open position with a battery disposed in a cavity of the cover.
Figure 2:
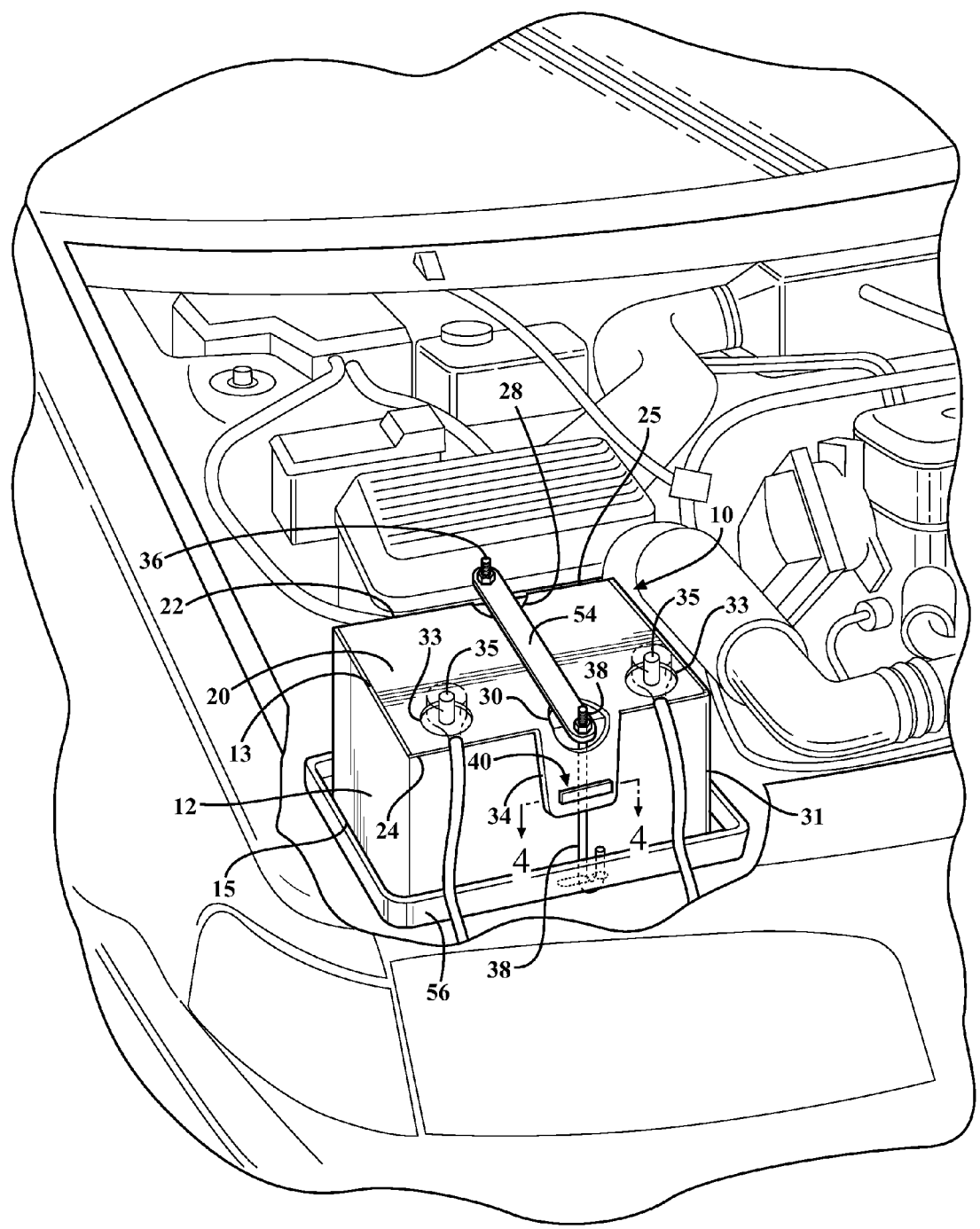
FIG. 2 is perspective view of the battery cover of FIG. 1 shown disposed within a vehicle in a closed position with a clamp member fastened to a pair of fastener member J-hooks.
Figure 4:
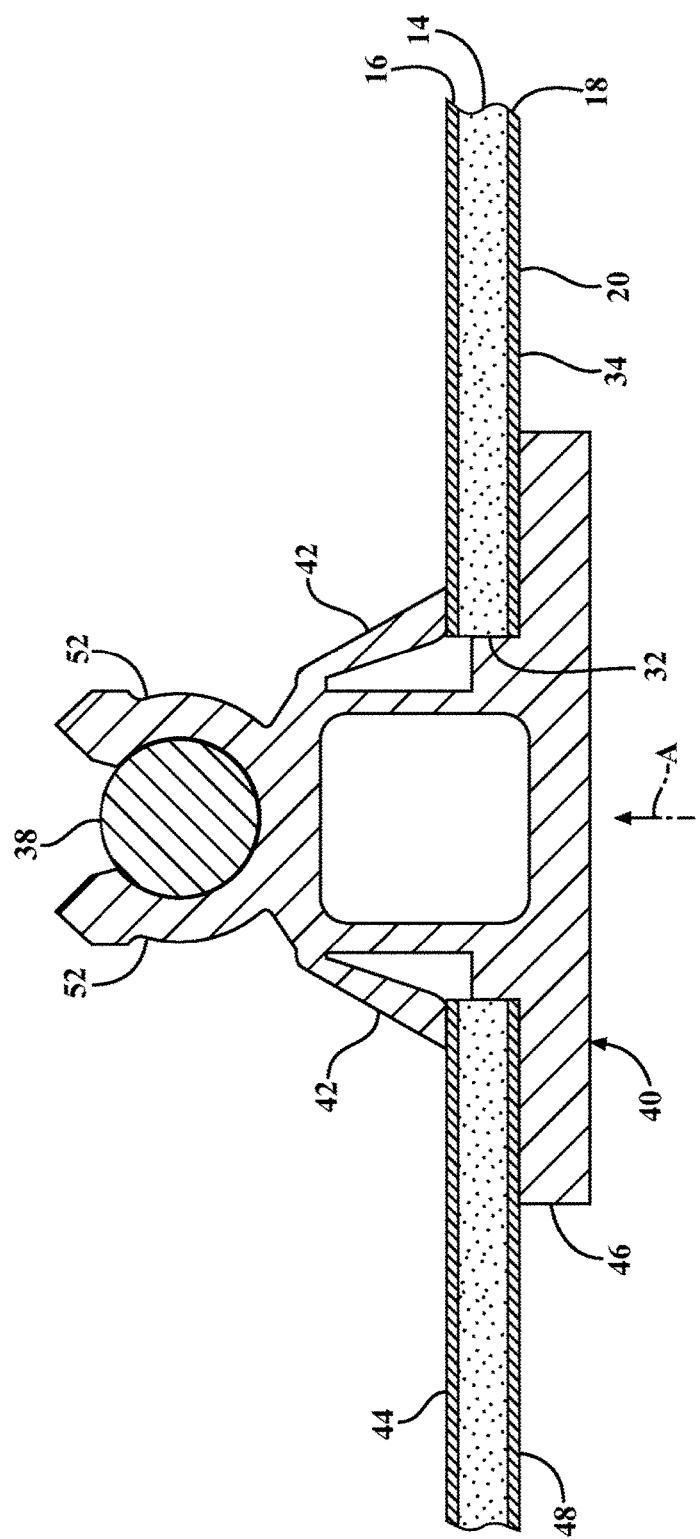
FIG. 4 is a cross-sectional view taken generally along the line 4-4 of FIG. 2 showing a fastener of the battery cover fastened to one of the fastener member J-hooks.

Referring in more detail to the drawings, FIGS. 1 and 2 illustrates a one-piece flexible, textile battery cover, referred to hereafter as cover 10, constructed in accordance with one aspect of the invention shown disposed about a vehicle battery 11 to form an assembly providing thermal protection about the peripheral sides and top of the battery 11. The cover 10 is formed having a flexible, one-piece wall 12, such that the cover 10 can be handled and disposed about the battery 11 as a single piece of material. The wall 12 is formed having tubular configured sidewalls, and thus, is circumferentially continuous about its peripheral sides and extends between a top end 13 and an opposite bottom end 15. The wall 12, as best shown in FIG. 4, has a nonwoven intermediate layer 14 to provide the desired thermal protection, and further includes opposite outer layers 16, 18 sandwiching the intermediate layer 14 therebetween. The cover 10 further includes a flexible textile top, also referred to as lid 20. The lid 20 is fixed to the wall 12 adjacent the top end 13 of the wall 12 at a fixed end 22 of the lid 20, wherein the lid 20 extends to a free end 24 opposite the fixed end 22. The lid 20 is operable to fold, such as via a living hinge 25 (understood in the art to be an integral hinge formed in the material itself, such as via a creased or reduced thickness region, for example), over the open top end 13 of the wall 12, thereby closing the open top end 13 to fully cover the battery 11 within a cavity 26 of the cover 10 and provide complete, enhanced and optimal thermal protection to the battery 11, while at the same time providing full and completely encapsulated protection to the battery 11 against environmental elements, e.g. fluids and debris contaminants. With the entirety of the fabric forming the cover 10 being highly flexible, the cover 10 is able to be readily compacted or generally flattened for shipping and storage purposes, thereby occupying minimal space in shipping and storage, which ultimately results in reduced shipping and storage costs. Further, the cover is lightweight, thereby minimizing the weight added by the cover 10 to the vehicle. In addition, the cover 10 is readily renewable, and thus, reduces the impact on landfills, and is economical in manufacture and installation.

The intermediate layer 14 can be constructed from green materials, with the green materials being provided from at least one of a blend of comminuted cardboard, natural fibers, recycled materials and/or waste stream materials, and can further include heat-settable fibers and/or heat-meltable textile fibers. The natural fibers can be provided from any suitable natural fibers, such as jute, kenaf, hemp and the like, and also from any suitable recycled materials and/or waste stream materials. The green materials can also be provided as any mixture of Asian (an inferior grade of cardboard commonly produced in Asian countries, e.g. China and Korea and shipped into the U.S., which is typically considered non-recyclable by various state environment agencies heretofore, such as in Connecticut, New Hampshire and Massachusetts) and standard cardboard material (that made from wood, such as pine, which is typical in the U.S.). Because recyclers typically allow only 5% Asian cardboard mixed with the "Standard Cardboard", the focus of this patent is on recycled cardboard with between 5% and 100% Asian cardboard. This "Standard" and "Asian" mixture will hereafter be referred to as "mixed Asian cardboard". As such, a method of recycling cardboard materials for use in manufacturing vehicle components, in accordance with one aspect of the invention, negates the need to separate inferior, low-grade cardboard materials, including Asian cardboard, from higher grade cardboard, such as that manufactured in the U.S. Accordingly, piles, bundles, or mixtures of standard high grade cardboard material from cardboard containers can be readily recycled in combination with the Asian cardboard without concern of separating the two types of cardboard materials from one another. The content of the cardboard, whether mixed or 100% Asian, is preferably between about 25-99 weight percent of the total web weight, depending on the desired characteristics of the cover 10, as desired. Generally, about 25% recycled material in a new product is needed in order to be considered a "Recycled" product.

If heat-meltable and/or heat-settable material is included in the textile intermediate layer 14, it can be provided, for example, as a low temperature melt polymeric material, such as fibers of polyethylene, PET or Nylon. It should be recognized that other low melt polymeric materials could be used, such as thermoplastic bi-component fibers whose outer sheath, such as polypropylene, for example, melts when heated above its melting point, while the inner core can be a heat-settable material than retains a heat-set shape. The low melt material, when melted, fuses with the mixture of any textile natural fibers present and the cardboard fibers and with remaining binders from the recycled cardboard materials. As an example, the melting point of the outer portion of a PET low melt bi-component fiber may be approximately 110° C.-180° C. as compared to the core melting at 250° C. Persons skilled in the art will recognize that other coatings or fillers and filler fibers may be used in place of low melt fibers to achieve the desired result.

The heat-meltable and thermally bondable textile material is provided having a suitable wt % content of the wall 12, such as about 10 wt % or more, by way of example and without limitation, to allow any free edges of the wall 12, such as side edges, to be bonded to one another to form the wall having welded seams, and the desired configuration, shown here, by way of example and without limitation, as being generally rectangular. It should be recognized that the wt % of heat-meltable material could be less than 10%, depending on the materials and bonding process used. The heat-meltable fibers are preferably provided from recycled plastic materials, such as recycled carpet or shredded PET rags, for example. Accordingly, the use of these recycled materials reduces the amount of materials being sent to landfills.

The process for constructing the nonwoven textile intermediate layer 14 includes mixing or blending the nonwoven materials, which as discussed, can include green materials, e.g. natural fibers, with the heat-meltable fibers and forming a web of the blended materials. The webbing process, which may be performed in an air-lay process, for example, on a Rando machine, or in a carding process, forms a homogenously mixed natural fiber/meltable fiber mat or web, with the green material and fibers being randomly oriented.

Then, upon forming the web, the web is consolidated to bind the green and fibrous materials to one another, such as via a mechanical, chemical and/or thermal process. For example, the web can be heated, such as in an oven, to a temperature suitable to at least partially melt the heat-meltable fibers, thereby thermally bonding the blend of green materials with the heat-meltable fibers. Otherwise, or in addition, the web can be subjected to a needling process to entwine the green materials and fibers with one another and/or to a chemical process wherein a chemical binder is utilized to bond the green materials and fibers together. Regardless of the consolidating process selected, the web is formed into a nonwoven sheet of intermixed and intertwined fibers, wherein the nonwoven sheet attains a desired thickness.

Figure 3B:
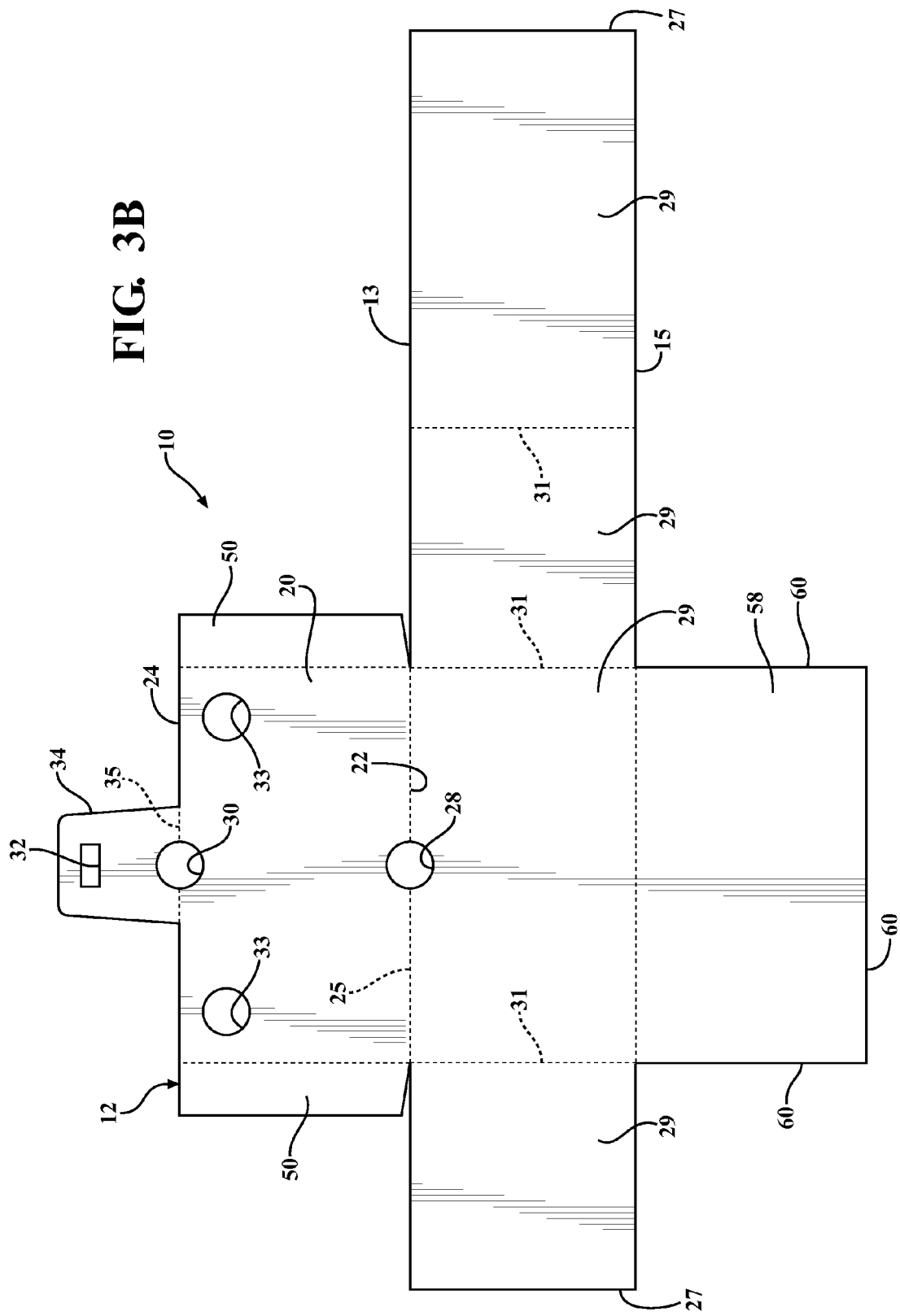
FIG. 3B is a view similar to FIG. 3A of a flat sheet of material formed into a predetermined configuration, in accordance with another aspect of the invention, with the material shown in an initial fabrication state prior to folding portions of the material into a batter cover.

Then, upon forming and cooling the nonwoven sheet 14, the outer layers 16, 18 can be bonded to the opposite sides of the intermediate layer 14 to complete the formation of the material of the wall 12. The outer layers 16, 18 can be formed of any suitable material desired to provide protection to the battery 11 against environmental elements, including engine fluids and water. As such, the outer layers 16, 18 can be provided as fluid impervious or substantially impervious layers of material, such as from scrim layers of nonwoven material, wherein the outer layers 16, 18 can be formed as relatively thin spun bond layers, as compared to the thicker intermediate layer 14. By way of example and without limitation, the outer layers 16, 18 can be formed, at least in part, from polypropylene. Then, upon completing construction of the wall material, the wall material can be cut to form the desired size, single, monolithic piece of material that forms the desired configuration of the wall 12, such as shown in FIGS. 3A and 3B, by way of example and without limitation. Then, sides 29 of the planar wall of material are folded appropriately, such as via living side hinges 31, whereupon any free edges needing to be fixed to one another are brought into abutting relation with one another. The free edges brought into abutment with one another are readily fixed to one another under, such as via bonding under the application of suitable heat, e.g. welded, such as in an ultrasonic welding process, or by a suitable adhesive or fastener, for example. By way of example and without limitation, side edges 27 of the wall 12 can be fixed to one another via one of the aforementioned fixation mechanisms to form a circumferentially continuous, tubular wall structure of the cover 10 bounding the cavity 26. As such, the wall 12 is configured having its circumferentially continuous peripheral sides 29 extending between the opposite top and bottom ends 13, 15, wherein at least the top end 13 is open to allow disposal of the battery into the cavity 26. It is contemplated herein that the lid 20 could be cut as a single, monolithic piece of material with the peripheral sidewalls 29, as shown in FIGS. 3A and 3B, or, the lid 20 could be cut as a separate piece of material, and then fixed to one of the upper edges of a sides 29 to form the fixed end 22, such as discussed above, namely, via one of the aforementioned fixation mechanisms, by way of example and without limitation.

Upon forming the overall planar geometry of the wall 12, including the lid 20, a plurality of through openings 28, 30, 32, 33 are formed in the wall 12, such as in a cutting operation, and are shown as being formed, at least in part, in the lid 20, for example. Of course, if the lid 20 is constructed separately from the wall 12, the openings 28, 30, 32 can be formed in the lid 20 prior to fixing the lid 20 to the wall 12. One of the openings 28 is adjacent the hinge 25 at the fixed end 22 and another opening 30 is adjacent the opposite free end 24. Further yet, another opening 32 is formed in an extension portion, also referred to as closure flap 34, of the lid 20. The flap 34 is shown having a reduced width relative to the full width of the lid 20, by way of example, such that the flap 34 extends outwardly from the free end 24. Upon closing the lid 20, the closure flap 34 is foldable, such as via a living hinge 35, to extend along one of the peripheral sides 29 of the wall 12 to facilitate fastening and maintaining the lid 20 in its closed position. The opening 28 adjacent the fixed end 22 of the lid 20 is provided to allow a first elongate fastener member, such as an elongate bolt member or J-hook 36 (known term in the art of vehicle batteries to identify a generally J-shaped fastener, rod or bolt having a J-shaped end configured to loop under the battery or support platform thereof and an opposite, straight threaded end configured for receipt of a threaded nut), to extend therethrough, while the opening 30 adjacent the opposite free end 24 is provided to allow a second elongate fastener member, such as another J-hook 38, to extend therethrough. Accordingly, it should be recognized that the J-hooks 36, 38 run along opposite sides of the cover 10 and battery 11. The openings 33 are provided to accommodate battery terminals 35, such that the terminals 35 are free to pass through the cover 10 in a close fit. It should be recognized that the openings 33 could be provided in a location other than as shown, depending on the intended use. Meanwhile, as shown in FIG. 4, the opening 32 is provided to facilitate attaching a fastener 40 to the closure flap 34. It should be recognized that the fastener 40 could be fixed to the closure flap 34 without an opening, such as via adhesive bonding, though, this would require additional processes and bonding materials. Accordingly, the mechanism shown in FIG. 4 is preferred, as the fastener 40 can simply be disposed in snap-fit fashion into the opening 32 along the direction of arrow A, whereupon a pair of spring members or spring fingers 42 function to retain the fastener 40, shown as a spring clip style fastener, in place. The fingers 42, upon being compressed radially inwardly and pressed through the opening 32, automatically expand radially outwardly into snap-fit abutment with an inwardly facing side surface 44 of the wall 12 and a flange 46 of the one piece fastener 40 is pressed against an outwardly facing side surface 48 of the wall 12. Accordingly, no extra materials or processes, other than pressing spring fingers 42 of the fastener 40 through the opening 32, are required to fix the fastener 40 to the closure flap 34.

Upon completing construction of the cover 10, the battery 11 is placed into the cavity 26 and the J-hooks 36, 38 are placed to extend along opposite sides 29 of the wall 12. Then, the lid 20 is folded about the living hinge 25 over the open top end 13 to cover and conceal the battery 11, whereupon portions of the J-hooks 36, 38 are guided through their respective openings 28, 30 in the lid 20. Further, as shown in FIG. 1, while closing the lid 20, side flaps 49 of the lid 20, if provided for added protection, can be disposed inwardly of opposite sides 29 of the wall 12 to provide added protection to the battery 11. Then, the fastener 40, facing inwardly toward the wall 12, is able to be simply and readily fastened via clipped action to the J-hook 38 via spring clip fingers 52, as shown in FIG. 4. Accordingly, assembly of the cover 10, including the lid 20, provides complete coverage about outwardly and upwardly exposed areas of the battery 11, with the bottom of the battery 11 being shielded by shelf 56 upon which the battery 11 rests, with only a single fastener 40 being needed to fix the cover 10 about the battery 11. Of course, the cover 10 can be formed with an integral bottom 58 formed as a monolithic piece of material with the remaining portion of the cover, as shown in FIG. 3B, where the bottom 58 can have side edges 60, with at least one or all of the side edges 60 being fixed, such as being bonded via welded seams, as discussed above, by way of example and without limitation, to abutting bottom ends 15 of the sides 29. With the battery 11 being fully enclosed in the cover 10, the remaining installation of the battery 11 with the vehicle can be completed by fastening a standard elongate battery clamp bracket 54 having openings configured for receipt of upper ends of the fastener members 36, 38 therethrough, wherein the bracket 54 generally extends across the width of the battery, whereupon threaded nuts are threaded to the upper end of the J-hooks 36, 38 to press the bracket 54 downwardly, as is known, against the lid 20 of the cover 10, thereby completing the cover-battery assembly.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A flexible, insulative battery cover for a vehicle battery assembly, comprising:
    a flexible, tubular textile wall having a cavity extending between a bottom end and an open top end of said wall;
    a flexible textile lid having a free end and an opposite end attached to said wall via a hinge, said lid being pivotal via said hinge between an open position, exposing said open top end of said wall, and a closed position, substantially closing off said top end;
    a fastener, formed of material separate from said lid, fixed to said lid adjacent said free end, said fastener being configured for releasable attachment to a first elongate fastener member of the vehicle battery assembly; and
    wherein said wall has a plurality of through openings, a first of said openings being adjacent said hinge and a second of said openings being adjacent said free end, wherein said first and second openings are configured for respective receipt of the first elongate fastener member and a separate second elongate fastener member therethrough, and further including a pair of openings configured for receipt of battery terminals therethrough.

2. The flexible, insulative battery cover of claim 1 wherein said wall and said lid are a monolithic piece material, with said hinge being a living hinge.

3. The flexible, insulative battery cover of claim 2 wherein said wall and said lid having a nonwoven intermediate layer sandwiched between substantially impervious outer layers.

4. The flexible, insulative battery cover of claim 1 wherein said lid has a flap foldable to extend along a side of said tubular wall via a living hinge, said fastener being fixed to said flap.

5. The flexible, insulative battery cover of claim 1 wherein said fastener has spring clip fingers for snapping attachment to the elongate fastener member.

6. The flexible, insulative battery cover of claim 1 wherein said lid has a pair of side flaps configured for receipt in said cavity inside said wall.

7. A vehicle battery and insulative cover assembly, comprising:
    a pair of elongate fastener members;
    an elongate clamp bracket having openings configured for receipt of said fastener members therethrough;
    a flexible, tubular textile wall having a cavity extending between a bottom end and an open top end of said wall;
    a flexible textile lid having a free end and an opposite end attached to said wall via a hinge, said lid being pivotal via said hinge between an open position, exposing said open top end of said wall, and a closed position, substantially closing off said top end;
    a fastener, formed of material separate from said lid, fixed to said lid adjacent said free end, said fastener being configured for releasable attachment to one of said elongate fastener members; and
    wherein said wall has a plurality of through openings, a first of said openings being adjacent said hinge and a second of said openings being adjacent said free end, wherein said first and second openings are configured for receipt of separate ones of said elongate fastener members therethrough, and further including a pair of openings configured for receipt of battery terminals therethrough.

8. The assembly of claim 7 wherein said wall and said lid are a monolithic piece material, with said hinge being a living hinge.

9. The assembly of claim 8 wherein said wall and said lid having a nonwoven intermediate layer sandwiched between substantially impervious outer layers.

10. The assembly of claim 7 wherein said lid has a flap foldable to extend along a side of said tubular wall via a living hinge, said fastener being fixed to said flap.

11. The assembly of claim 7 wherein said fastener has spring clip fingers for snapping attachment to said one of said elongate fastener members.

12. The assembly of claim 7 wherein said lid has a pair of side flaps configured for receipt in said cavity inside said wall.

13. A method of constructing a battery cover for a vehicle batter assembly, comprising:
    forming a flexible, tubular textile wall to provide a cavity extending between a bottom end and an open top end of said wall;
    providing a flexible textile lid having a free end and an opposite end attached to said wall via a hinge, said lid being pivotal via said hinge between an open position, exposing said open top end of said wall, and a closed position, substantially closing off said top end;
    fixing a fastener, formed of material separate from said lid, to said lid adjacent said free end of said lid, said fastener being configured for releasable attachment to an elongate fastener member of the vehicle battery assembly; and
    further including forming a plurality of through openings in the lid, a first of the openings being adjacent the hinge and a second of the openings being adjacent the free end, wherein the first and second openings are configured for respective receipt of the first elongate fastener member and a separate second elongate fastener member therethrough, and further including configuring a pair of the plurality of through openings for receipt of battery terminals therethrough.

14. The method of claim 13 further including forming the lid as a monolithic piece material with the wall, with the hinge being a living hinge.

15. The method of claim 14 further including forming the wall and the lid as a nonwoven intermediate layer sandwiched between substantially impervious outer layers.

16. The method of claim 13 further including forming a pair of side flaps along opposite sides of the lid, with the side flaps being configured for receipt in the cavity inside the wall.

* * * * *